United States Patent [19]
Ernst

[11] 4,064,946
[45] Dec. 27, 1977

[54] SPRING TRIP MECHANISM

[76] Inventor: Arnold E. Ernst, Wolverton, Minn. 56594

[21] Appl. No.: 621,470

[22] Filed: Oct. 10, 1975

[51] Int. Cl.² ............................................. A01B 61/04
[52] U.S. Cl. ...................................... 172/710; 172/264
[58] Field of Search .............. 172/261, 264, 265, 269, 172/643, 657, 705, 706, 707, 708, 709, 710, 748, 266, 267, 268, 336, 337, 462, 474, 497, 498, 499, 500, 570, 572, 573, 719; 37/42 VL; 214/762; 74/526; 197/30; 16/191

[56] References Cited

U.S. PATENT DOCUMENTS

| 177,082 | 5/1876 | Strout | 16/191 UX |
|---|---|---|---|
| 404,845 | 6/1889 | Kissell | 172/268 |
| 1,110,986 | 9/1914 | Berg | 172/657 X |
| 1,205,416 | 11/1916 | Trout | 172/719 |
| 1,502,832 | 7/1924 | Kirtlan | 172/710 |
| 1,593,929 | 7/1926 | Carrier | 16/191 |
| 2,731,899 | 1/1956 | Abrams | 172/710 X |
| 2,944,613 | 7/1960 | Anderson | 172/710 X |
| 3,321,031 | 5/1967 | Evans | 172/657 X |

FOREIGN PATENT DOCUMENTS

| 110,020 | 3/1940 | Australia | 172/705 |
|---|---|---|---|
| 348,711 | 5/1931 | United Kingdom | 172/657 |

Primary Examiner—Richard T. Stouffer
Attorney, Agent, or Firm—Henderson, Strom & Sturm

[57] ABSTRACT

A device for mounting an earth working tool to a tool bar for allowing the earth working tool to move upwardly and rearwardly when it encounters an object which it cannot penetrate, rather than placing an undesirably high force on the earth working tool itself. A tool holding rod is moveably mounted in a slot in a housing and is pivotally connected to a pair of levers which are, in turn, pivotally connected to the housing. Biasing structure is provided for urging the earth working tool to a proper working position.

7 Claims, 4 Drawing Figures

SPRING TRIP MECHANISM

BACKGROUND OF THE INVENTION

The present invention relates generally to earth working tools such as tillage tools and plows, and more particularly to a spring trip release structure for such an earth working tool.

One of the problems with earth working tools such as plows, cultivators, and other tillage tools is that when the tool hits a hard object, such as a rock, quite often a portion of the tool itself or its connecting structure breaks. Much attention has been given to this problem, and the most widely accepted solution has been the use of a structure which allows the tool to pivot rearwardly and somewhat upwardly as is shown in U.S. Pat. Nos. 3,098,529; 3,431,982 and 3,493,055 for example. Springs are also provided on such units for automatically returning the tillage tool to its original earth working position after it has passed the obstruction.

The problem has been that quite often the tool itself simply does not travel high enough when tripped to completely avoid the obstruction and prevent breakage. This is especially true on the frequent occassions when a rock is pulled upwardly from the ground by the tillage tools so that it is higher than when it was originally encountered. Consequently, there is a need to move the earth working tool as high as possible and as soon as possible when the tool meets an obstruction, and then return the tool as quickly as possible back in to its proper earth working position.

SUMMARY OF THE INVENTION

The present invention relates to a device for mounting an earth working tool to a tool bar. A tool holding rod is disposed within a slot in a housing. A lever is pivotally mounted to the housing and to the tool holding rod. Biasing means is provided for urging the tool holding rod and thereby the earth working tool to a proper earth working position, but when the earth working tool encounters an object it cannot penetrate, it will be moved rearwardly and lifted upwardly by reason of the pivoted lever arrangement.

An object of the present invention is to prevent damage to earth working equipment, especially tillage tools.

Another object of the invention is to provide a structure for imparting a substantial lifting movement to an earth working tool when that tool encounters an object it cannot penetrate, such as a large rock.

A further object of the invention is to provide a tillage tool which is biased into a proper earth working position but which is moveable from that position when it encounters an object.

Other objects, advantages, and novel features of the present invention will become apparent from the following detailed description of the invention when considered in conjunction with the accompanying drawings.

DESCRIPTION OF THE PREFERRED EMBODIMENT

Figure 1:
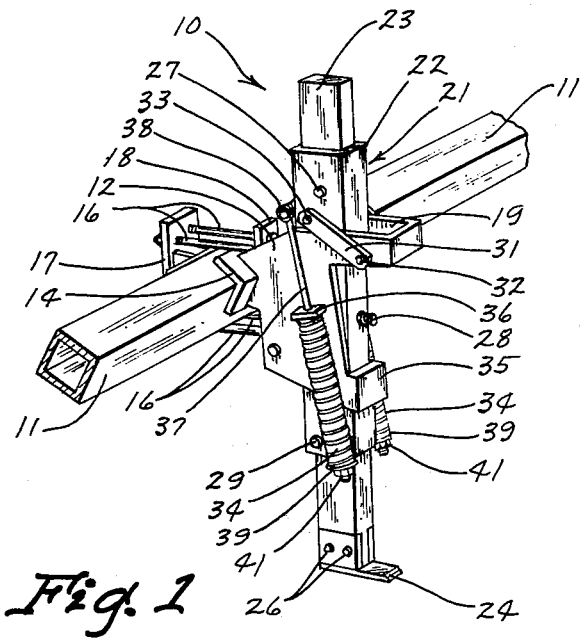
FIG. 1 is a perspective view of the present invention connected to a tool bar.
Figure 2:
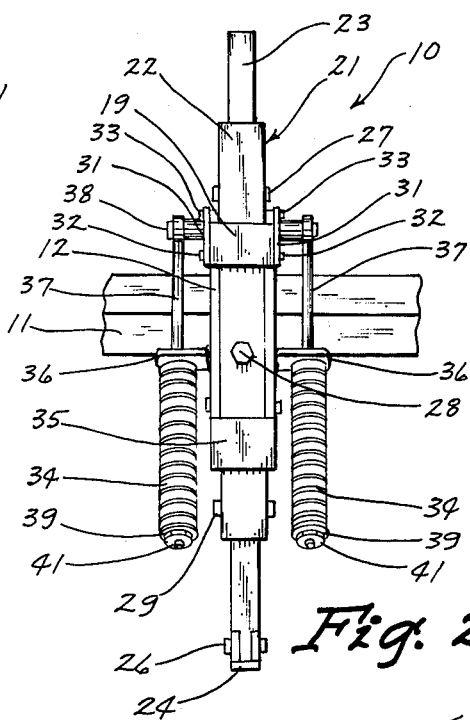
FIG. 2 is a front view of the invention shown in FIG. 1.

Referring now to the drawings wherein like reference numerals designate identical or corresponding parts throughout the several views, FIG. 1 shows the present invention 10 connected to a tool bar 11. A housing 12 is clamped to the tool bar 11 by means of a clamping structure which includes right angled members 13 and 14 which are held in place by nut and bolt structures 16. The nut and bolt structures 16 are, in turn, received through openings in the plates 17 and 18.

Figure 3:
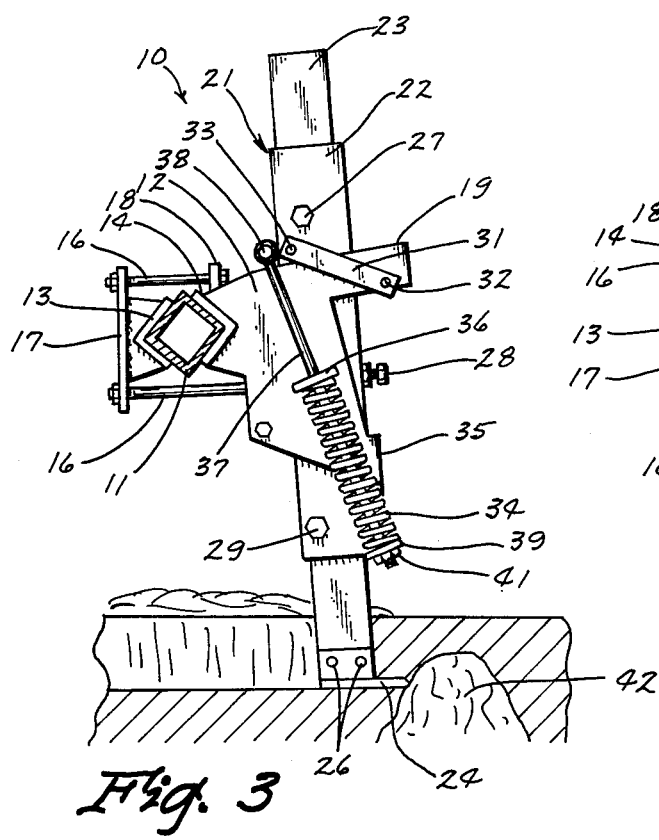
FIG. 3 is a side view of the present invention shown in its normal earth working position.

The housing 12 has an opening 19 which extends from the extreme top thereof to the extreme bottom thereof. A tool holding rod 21 is slideably and moveably received within the slot 19 of the housing 12, and is comprised of a sleeve portion 22 and a shaft portion 23. The shaft portion 23 has an earth working tool 24 rigidly connected to the bottom thereof by means of a pair of nut and bolt devices 26. A plurality of bolts or set screws 27, 28 and 29 make the tool holding rod adjustable so that, as seen in FIG. 3 for example, the earth working tool 24 may be adjusted upwardly or downwardly at the level desired, by sliding the shaft portion 23 to the position desired and then tightening down the bolts 27, 28 and 29. Alternatively, there could be a number of holes through the shaft portion 23 through which the bolts 27–29 could extend to form this adjustable feature.

A lever 31 is pivotally mounted to the housing 12 by the pivot pin 32 at one end thereof; and, this lever 31 is pivotally attached to the tool holding rod 21 by means of the pivot pin 33.

The tool holding rod 21 and thereby the tillage tool 24 is biased to the position as shown in the FIG. 3 by means of a spring 34 and the structure connected thereto. A bracket 36 is rigidly affixed to each side of the housing 12, and a shaft 37 extends through a hole in this bracket 36. The shaft 37 is pivotally connected by a pivoting pin 38 at one end thereof to the tool holding rod 21 and the shaft 37 has a plate 39 held in place by a nut 41 at the other end thereof. The compression spring 34 is disposed around the shaft 37 and has one end abutting the bracket 36 and the other end in abutment with the plate 39 to thereby urge the tool holding rod 21 to the position as shown in FIG. 3. The spring 34, in other words, has a tendancy to pull the pivot pin 36 and thereby the tool holding rod 21 downwardly toward the bracket 36, but it can pull it in this direction only down to the point at which the pin 33 abuts the top of the housing 12.

Figure 4:
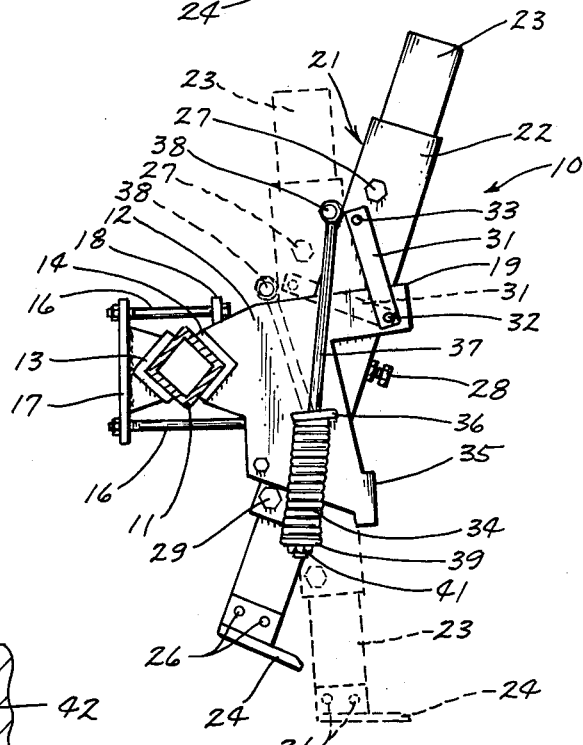
FIG. 4 is a side view of the present invention similar to FIG. 3 but showing the invention in the position to which it would move when it has encountered a rock or other object too hard to penetrate.

In operation, a number of these spring trip units are attached to a tool bar 11 and are normally pulled behind a tractor which controls the vertical position of the tool bar 11 by means of a three point hitch arrangement. These plurality of devices are then pulled along as is shown in FIG. 3 until such time that one or more of the earth working tools 24 would encounter a rock 42 or other impenetrable object. When this occurs, the force of the object 42 against the earth working tool 24 will tend to cause the tool holding rod 21 to pivot about the pivotal point 32; and, because of the lever 31, it will be raised upwardly as well as rearwardly as is shown in solid lines in FIG. 4, as compared to the dashed lines in FIG. 4 which show its position as it encounters the object 42 in FIG. 3.

Accordingly, it can be seen that the present invention does indeed accomplish the objects mentioned above and provides a spring trip device which lifts the tillage tool in a positive manner higher than would be possible by the prior devices which only pivot the tool holding rod. Obviously, many modifications and variations of the present invention are possible in light of the above teachings. It is therefore to be understood that, within the scope of the apended claims, the invention may be practiced otherwise than as specifically described.

I claim:

1. A device for connection to an earth working tool comprising:
    a housing having a slot therein;
    means for connecting said housing to a tool bar;
    a tool holding rod being disposed in said slot, said rod having an earth working tool connected to the bottom end thereof;
    at least one lever pivotally connected to said housing, said lever being pivotally attached to said rod; and
    means for biasing said tool holding rod to a first position whereby when said earth working tool encounters an object it cannot penetrate, the tool holding rod and thereby the earth working tool moves rearwardly and upwardly with respect to the housing, said biasing means comprising:
    a bracket connected to said housing and having an opening therein;
    a shaft, said shaft having a first end and a second end, said shaft extending through said bracket and being pivotally connected to said tool holding rod at a point above the housing, a plate connected to the second end of the shaft and a compression spring being disposed around said shaft, one end of said compression spring being adjacent to said bracket and the other end thereof being adjacent to said plate.

2. A device for connection to an earth working tool comprising:
    a housing having a slot therein;
    means for connecting said housing to a tool bar;
    a tool holding rod extending through said slot, said rod having an earth working tool connected to the bottom end thereof;
    at least one lever, said lever having a first pivotal connection on one end thereof pivotally connecting said lever to said housing, said lever having a second pivotal connection on the other end thereof pivotally connecting said lever to said rod; said lever acting as constraining means for said rod constraining said rod to a state of motion wherein as said rod pivots with respect to said housing, the axis around which said rod pivots moves upwardly with respect to said housing.

3. The device of claim 2 wherein the pivotal connection of the lever to the housing is at the upper front of the housing and wherein the pivotal connection of the lever to the tool holding rod is rearwardly thereof.

4. The device of claim 2 including means disposed on said housing for preventing said tool holding rod from moving in said first direction beyond said first position.

5. The device of claim 4 including means disposed on said housing for preventing said tool holding rod and said lever to move in a second direction opposite to said first direction beyond a second position of said tool holding rod and lever, with respect to said housing.

6. The device of claim 5 wherein the tool holding rod is substantially vertically disposed in said first position thereof and is substantialy non-vertically disposed in the second position thereof.

7. The device of claim 2 wherein the pivotal connection of the lever to the housing is at all times below the pivotal connection of the rod to the lever.

* * * * *